US009115664B2

(12) United States Patent
Stroh et al.

(10) Patent No.: US 9,115,664 B2
(45) Date of Patent: Aug. 25, 2015

(54) ENGINE CONTROL SYSTEMS AND METHODS

(75) Inventors: David Stroh, Columbus, IN (US); Govindarajan Kothandaraman, Columbus, IN (US); Carlos Alcides Lana, Columbus, IN (US); Karim Abdoul Azizou, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 496 days.

(21) Appl. No.: 13/591,590

(22) Filed: Aug. 22, 2012
(Under 37 CFR 1.47)

(65) Prior Publication Data

US 2014/0058645 A1 Feb. 27, 2014

(51) Int. Cl.

| | |
|---|---|
| ***B60T 7/12*** | (2006.01) |
| ***F02D 41/26*** | (2006.01) |
| ***F02D 41/14*** | (2006.01) |
| *F02D 41/34* | (2006.01) |
| *F02D 41/00* | (2006.01) |

(52) U.S. Cl.
CPC ............ *F02D 41/26* (2013.01); *F02D 41/1497* (2013.01); *F02D 41/0002* (2013.01); *F02D 41/345* (2013.01); *F02D 2250/18* (2013.01); *F02D 2250/21* (2013.01); *F02D 2250/22* (2013.01)

(58) Field of Classification Search
CPC ............................. F02D 41/0002; F02D 37/02
USPC .................. 701/103, 104; 123/679, 681, 434, 123/406.23, 406.24
See application file for complete search history.

(56) References Cited

U.S. PATENT DOCUMENTS

| | | | | |
|---|---|---|---|---|
| 6,073,619 | A | 6/2000 | Baranowski | |
| 6,209,519 | B1 | 4/2001 | Melchior et al. | |
| 6,263,860 | B1 * | 7/2001 | Firey | 123/430 |
| 6,278,933 | B1 * | 8/2001 | Buckland et al. | 701/104 |
| 6,295,965 | B1 * | 10/2001 | Firey | 123/250 |
| 6,457,309 | B1 * | 10/2002 | Firey | 60/517 |
| 6,712,042 | B1 | 3/2004 | Kustosch | |
| 7,509,209 | B2 | 3/2009 | Davis et al. | |
| 7,567,866 | B2 | 7/2009 | Kokubu | |
| 2003/0209235 | A1 * | 11/2003 | Javaherian | 123/674 |
| 2008/0125951 | A1 | 5/2008 | Livshiz et al. | |
| 2008/0294325 | A1 | 11/2008 | Kurotani et al. | |
| 2009/0229565 | A1 | 9/2009 | Kang et al. | |
| 2010/0057325 | A1 | 3/2010 | Livshiz et al. | |
| 2010/0198485 | A1 | 8/2010 | Ohtsuka et al. | |
| 2011/0100323 | A1 | 5/2011 | Bradley et al. | |
| 2011/0139117 | A1 | 6/2011 | Kar et al. | |
| 2012/0035834 | A1 | 2/2012 | Takahashi | |

FOREIGN PATENT DOCUMENTS

| | | | |
|---|---|---|---|
| GB | 2 024 462 | A | 1/1980 |
| WO | WO 2006/036265 | A2 | 4/2006 |

OTHER PUBLICATIONS

International Search Report and Written Opinion, ISAUS, PCT2013/56302, Cummins Inc., Jan. 22, 2014.

* cited by examiner

*Primary Examiner* — John Kwon
(74) *Attorney, Agent, or Firm* — Taft Stettinius & Hollister LLP

(57) ABSTRACT

A system comprising an air actuator configured to control air delivered to an engine; a fuel actuator configured to control fuel delivered to an engine; and a controller configured to: actuate the air actuator in response to a first torque signal; and actuate the fuel actuator in response to a second torque signal.

29 Claims, 5 Drawing Sheets

ENGINE CONTROL SYSTEMS AND METHODS

BACKGROUND

The technical field generally relates to engine control systems diagnostics and, in particular, to engine control systems using torque actuation.

Spark ignited (SI) engines can be controlled differently than compression ignited (CI) engines. For example, SI engines typically attempt to maintain a stoichiometric air to fuel ratio (AFR). Torque from an SI engine is primarily controlled through control of air. In contrast, the AFR for CI engines can vary from the stoichiometric AFR. Accordingly, fuel can be controlled independent of air, introducing a control not available on homogenous charge SI engines. Furthermore, gasoline direct injection (GDI) SI engines can be operated with stratified charges, i.e. with varying AFR. Thus, the control of torque can vary based on engine structure.

Therefore, further technological developments are desirable in this area.

SUMMARY

One embodiment is a unique system comprising an air actuator configured to control air delivered to an engine; a fuel actuator configured to control fuel delivered to an engine; and a controller configured to: actuate the air actuator in response to a first torque signal; and actuate the fuel actuator in response to a second torque signal.

Other embodiments include unique methods and systems to control engines of different types. Further embodiments, forms, objects, features, advantages, aspects, and benefits shall become apparent from the following description and drawings.

DESCRIPTION OF THE ILLUSTRATIVE EMBODIMENTS

Figure 1:
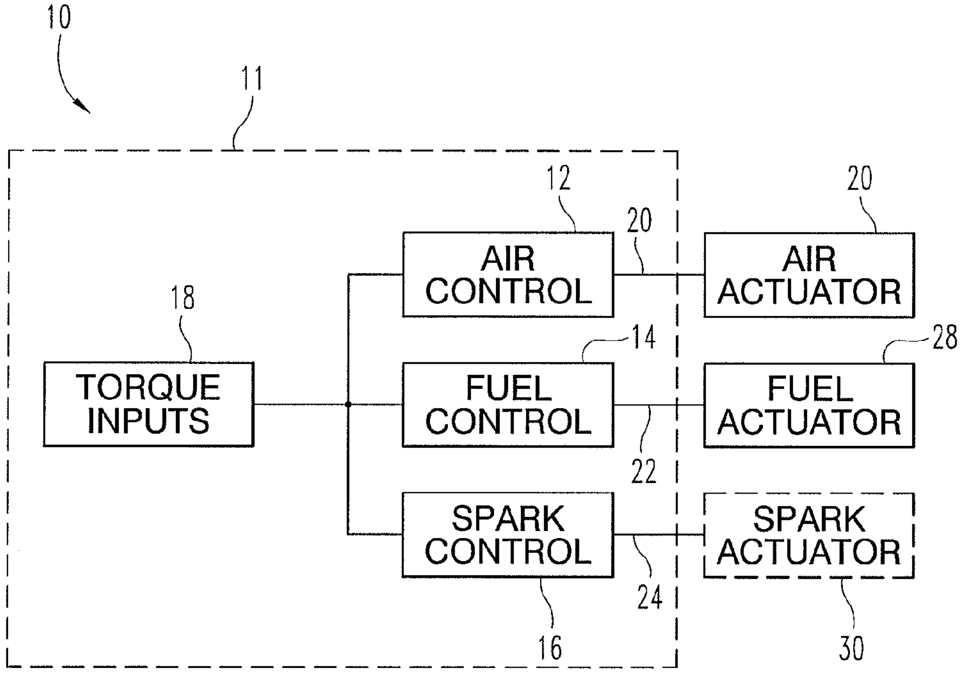
FIG. 1 is a block diagram of a torque based engine control system according to an embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

In an embodiment, engine systems having different architectures can be controlled by a common torque control technique. That is, a common technique can be applied to spark ignited (SI) engines, gasoline direct injection (GDI) engines, compression ignited (CI) engines, or other similar engines based on fuel and air. As will be described in further detail below, in an embodiment, a torque based interface can provide a transformation from the torque input to appropriate fuel, air, and other parameters for a particular engine architecture.

FIG. 1 is a block diagram of a torque based engine control system according to an embodiment. In this embodiment the engine control system 10 includes a controller 11. The controller is configured to provide air control 12, fuel control 14, and spark control 16. The controls 12, 14, and 16 can be responsive to one or more torque inputs 18.

The controller 11 can be coupled to various actuators. An air actuator 26, a fuel actuator 28, and a spark actuator 30 are illustrated. However, other actuators can be present.

The air control 12 can be configured to generate an air control signal 20. The air actuator 26 can be configured to control delivery of air to an engine in response to the air control signal 20. For example, the air actuator 26 can be an electronic throttle. Any device coupled to a compressor, throttle, intake manifold, or the like can be the air actuator 26 or part of the air actuator 26, and can be responsive to the air control signal 20.

Similarly, the fuel control 14 can be configured to generate a fuel control signal 22. The fuel actuator 28 can be configured to control delivery of fuel to the engine in response to the fuel control signal 22. For example, the fuel actuator 28 can include fuel injectors, fuel pumps, other fuel system components, or the like.

The spark actuator 30 can be configured to control ignition in an engine in response to the spark control signal 24. For example, the spark actuator 30 can be an electronic ignition system configured to actuate spark plugs. Although spark plugs as part of a spark actuator 30 as been used as an example, any device that can affect a timing, sequence, or the like of an ignition can be part of the spark actuator 30 and can be responsive to the spark control signal 24.

The spark actuator 30 is illustrated in phantom. In particular, the spark actuator 30 can be present in an SI engine. However, a spark actuator 30 may not be present in a CI engine. In an embodiment, the spark control 16 functionality can still be present in the controller 11 for a CI engine, yet a connection to a spark actuator 30 is not made as it is not present for the CI engine. That is, the same controller 11 and/or functionality implemented by the controller can be used between SI and CI engines.

In an embodiment, the controller 11 can be configured to respond to a variety of torque inputs 18. For example, the torque inputs 18 can represent an instantaneous torque and a longer-term torque. The instantaneous torque can be a desired torque on a time scale of a cylinder event, such as a power stroke of a piston, a complete cycle of a cylinder, or the like.

The longer-term torque can represent a desired torque over a longer time scale. For example, a threshold for a longer-term torque can include multiple cylinder cycles. In an embodiment, the number of cycles can be on the order of a number of cylinders of an engine, such as 4, 6, 8, 10, 12, or the like. In another embodiment, the division between instantaneous torque and longer-term torque can be substantially independent of cylinder cycles. For example, the division can be based on a propagation delay time for an air control system including the air actuator 26.

In an embodiment, torque generated in response to an air actuator 26 can have a slower response than torque generated by a fuel actuator 28. Accordingly, two torque signals can be used. As will be described in further detail below, an air actuator can be actuated in response to a first torque signal and a fuel actuator can be actuated in response to a second torque signal. The longer-term torque signal and the instantaneous torque signal can be the first and second torque signals. That is, the air actuator can be actuated in response to the longer-term torque signal and the fuel actuator can be actuated in response to the instantaneous torque signal; however, in other embodiments, the various actuators 26, 28, and 30 can be responsive to different torque signals, combinations of such torque signals, or the like.

The torque signals 18 can be generated from a variety of sources. For example, longer-term torque signals can be generated by a user, a cruise-control system, an idle-control system, or the like. Any system that may change on a time scale on the order of or greater than a response time of an air control system can provide part or the entire longer-term torque signal. Similarly, control systems that change at a faster rate, such as a transmission control system, or the like, can contribute to the instantaneous torque signal. Although a responsiveness of an air control system has been used as a threshold, a division between contributors to the torque signals can be selected as desired to apportion contributions to the air control 12, fuel control 14, spark control 16, or the like.

Furthermore, any number of torque inputs 18 can be used. For example, each of the air actuator 26, fuel actuator 28, and spark actuator 30, can be configured to have different response times. Each could have a different associated torque input 18.

Figure 2:
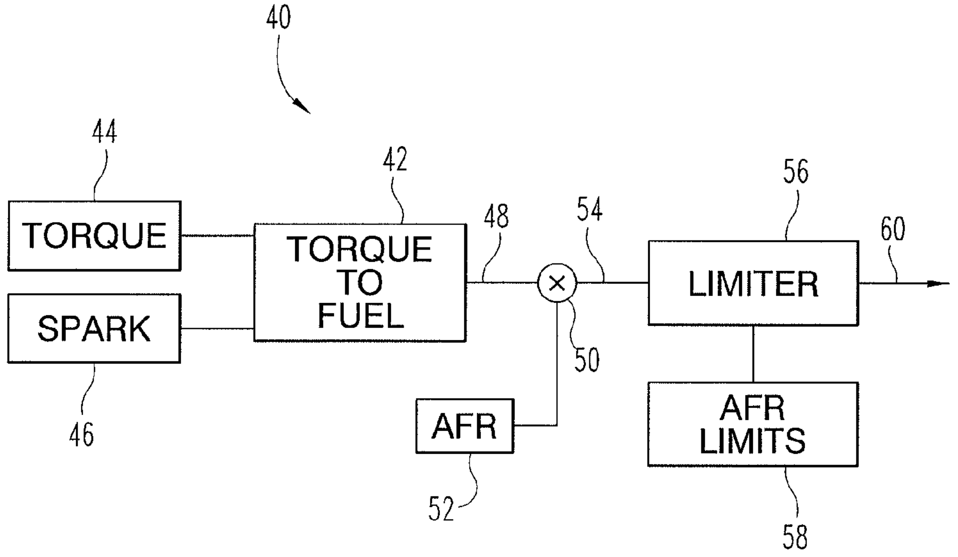
FIG. 2 is a block diagram of an example of an air control system according to an embodiment.

FIG. 2 is a block diagram of an example of an air control system according to an embodiment. In this embodiment, the air control 40 includes a torque to fuel conversion 42. The torque to fuel conversion 42 can be configured to convert a torque input 44 into a fuel signal 48. Other signals can be input to the torque to fuel conversion 42. In this embodiment, a spark signal 46 can be input to the torque to fuel conversion 42. The spark signal 46 can be an optimum spark signal, such as a maximum braking torque. In response, the torque to fuel conversion 42 can convert the torque signal 44 and spark signal 46 to the fuel signal 48. In an embodiment, the torque signal 44 can be the longer-term torque signal described above.

The fuel signal 48 can be multiplied with an AFR 52 in multiplier 50 to generate an air signal 54. AFR limits 56, such as emissions limits, operational limits, or the like, can be applied by limiter 56. For example, for a CI engine, a lower limit can be related to a smoke limit and an upper limit can be related to nitrogen oxide emissions. In another example, the AFR limit can be related to a stoichiometric AFR or other target AFR of an SI engine. Accordingly, the air signal 54 can be limited by such limits to generate the air control signal 60. The air control signal 60 is an example of the air control signal 20 described above.

As described above, different limits and/or sets of limits can be used on different engine types. That is, a CI engine can have an upper and lower AFR limit while an SI engine can have a stoichiometric or single target AFR limit. This change can reflect a difference between an SI engine and a CI engine. Thus, the control system can be applied with different engine types with such a parameter change while the underlying software, firmware, or the like need not change.

Figure 3:
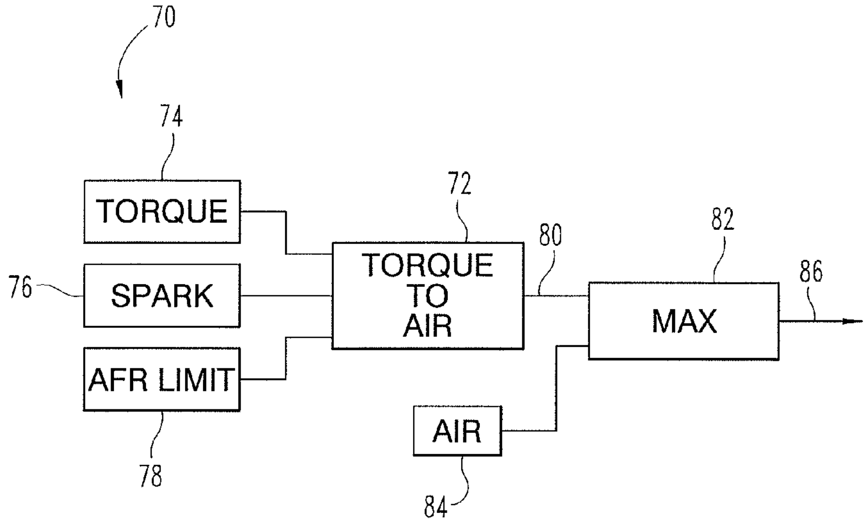
FIG. 3 is a block diagram of another example of an air control system according to an embodiment.

FIG. 3 is a block diagram of another example of an air control system according to an embodiment. In this embodiment, the air control 70 includes a torque to air converter 72. The torque to air converter 72 is configured to convert a torque signal 74, a spark signal 76, and an AFR limit signal 78 into an air signal 80. For example, a longer-term torque signal and an optimal spark signal can be converted into an intermediate air signal. The air signal can be limited by a lower limit AFR signal to generate the air signal 80. That is, an amount of air for a desired torque can be determined then limited by a lower AFR limit, for example a smoke limit.

The maximum 82 of the air signal 80 and a second air signal 84 can be used to generate air signal 86. The air signal 84 can be an input from other control systems, such as the fuel control 14, spark control 16, or the like. Accordingly, a longer-term normally lean mode of operation can be used. That is, a maximum of the desired air can be used so that additional margin can be present to operate the engine with a richer AFR, potentially without increasing the amount of air supplied to a cylinder.

The maximum air signal 86 can be used as the air control signal 20 described above to actuate the air actuator 26. However, in other embodiments, the maximum air signal 86 can be limited by AFR limits as in FIG. 2, such as by an upper AFR limit, or the like.

Figure 4:
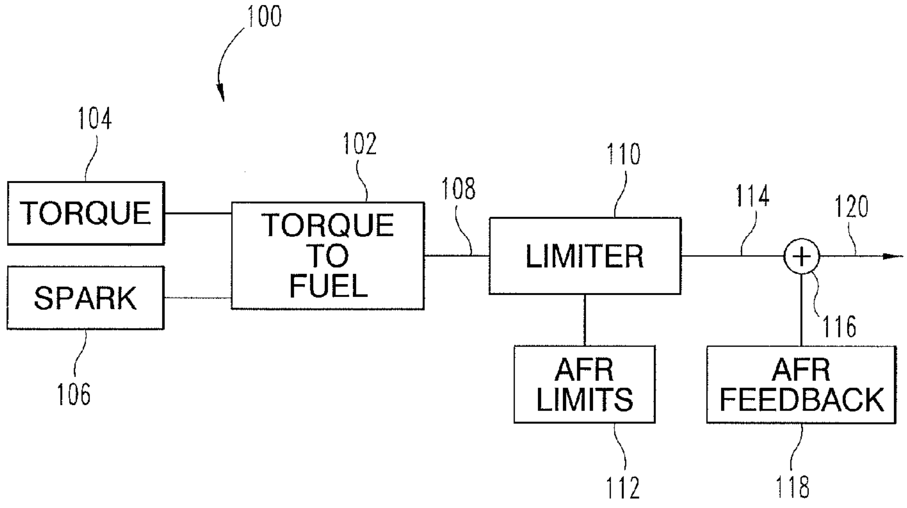
FIG. 4 is a block diagram of an example of a fuel control system according to an embodiment.

FIG. 4 is a block diagram of an example of a fuel control system according to an embodiment. In this embodiment, the fuel control 100 includes a torque to fuel converter 102. The torque to fuel converter 102 is configured to convert a torque signal 104 and a spark signal 106 into a fuel signal 108.

In particular, the fuel signal 108 can be a second fuel signal if used in conjunction with the air control 40 described above. Furthermore, the torque signal 104 can be an instantaneous torque signal as described above. That is, control signals of the fuel control 100 can be based on a different torque signal than the air control 40.

The fuel control signal 108 can be limited by limiter 110. The limits can be AFR limits 112. In an embodiment, the AFR limits 112 for the fuel can be formed from an AFR limit in an air-to-fuel ratio format and an estimated air signal. For example, for a given cycle of the fuel control 100, an estimated amount of air can be divided by one or more air-to-fuel ratios to generate the AFR limits 112 for the fuel signal 108. Accordingly, a limited fuel signal 114 can be generated. Similar to the air control 40 described above, the AFR limits 112 can be selected as appropriate to the type of engine.

The limited fuel signal 114 can be used as a setpoint for an AFR control loop. For example, an AFR feedback system 118 can provide feedback from an oxygen sensor. This can be combined appropriately in adder 116 to generate fuel control signal 120. The fuel control signal 120 can be used as the fuel control signal 22 described above.

Figure 5:
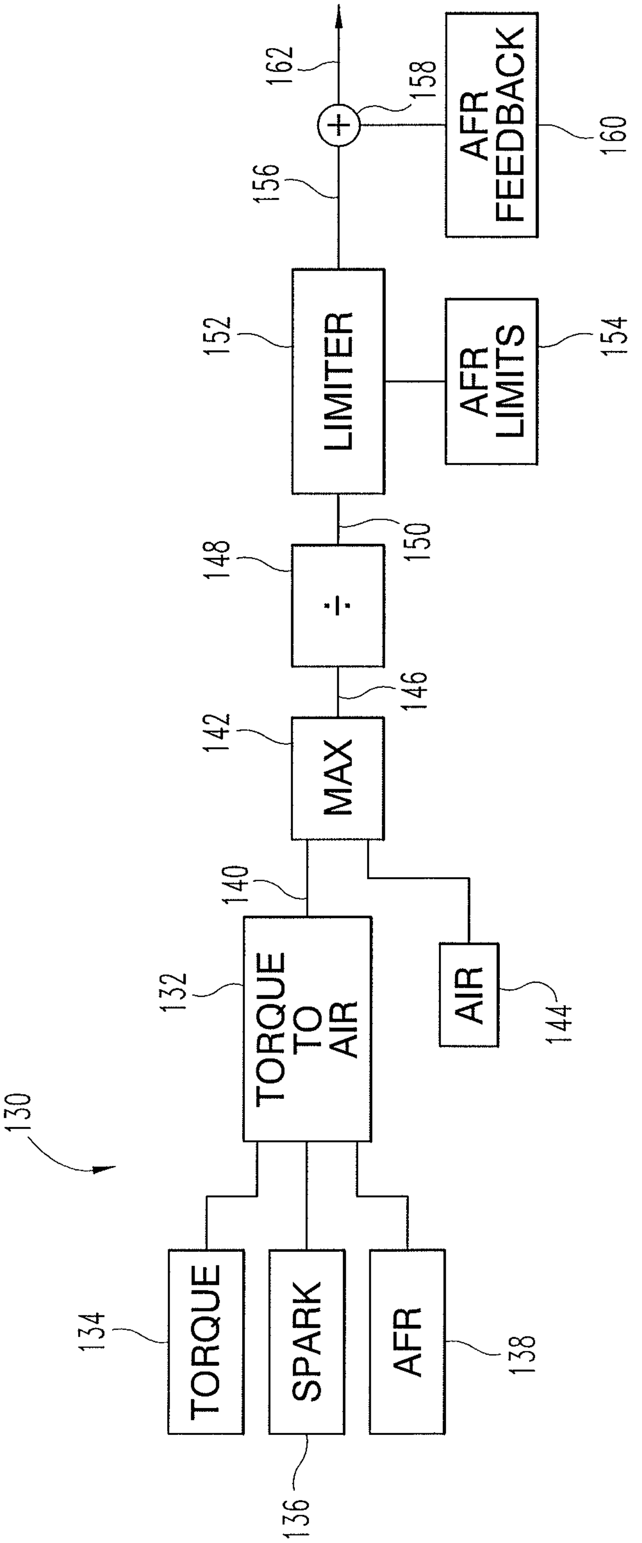
FIG. 5 is a block diagram of another example of a fuel control system according to an embodiment.

FIG. 5 is a block diagram of another example of a fuel control system according to an embodiment. In this embodiment, the fuel control 130 includes a torque to air converter 132. Similar to the torque to air converter 72, the torque to air converter 132 can be configured to convert a torque input 134, and a spark input 136 to an air signal 140. However, the torque to air converter 132 can also be configured to generate the air signal 140 in response to an AFR input 138. For example, the torque input 132 can be the instantaneous torque and the spark input 136 can be an optimal spark timing. In addition, the AFR input 138 can be a target AFR signal.

A maximum 142 of the air signal 140 and another air signal 144, such as an air signal 80 described above, can generate a maximum air signal 146. The maximum air signal 146 can be divided in 148 by the target AFR signal 138 to generate a fuel signal 150. The fuel signal 150 can be limited by limiter 152 and AFR limits 154 similar to FIG. 3 to generate a limited fuel signal 156. In addition, the limited fuel signal 156 can be an input to an AFR control system with AFR feedback 160 and adder 158 to generate the fuel control signal 162. The fuel control signal 162 can be used as the fuel control signal 22 described above.

Although various torque to fuel converters and torque to air converters have been described above using air-based signals or fuel-based signal, the character of the control signals can be implemented as desired. For example, the air control 20 can use air-based control signals while the fuel control 22 uses fuel-based control signals, or vice-versa.

Figure 6:
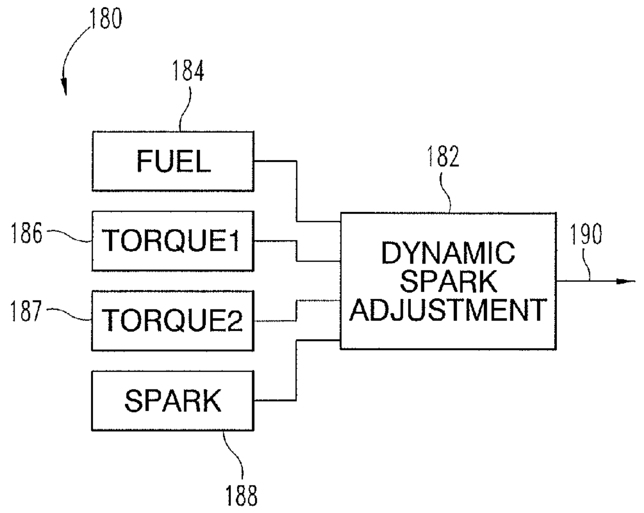
FIG. 6 is a block diagram of a spark control system according to an embodiment.

FIG. 6 is a block diagram of a spark control system according to an embodiment. In this embodiment, the spark control 180 can be configured to generate a spark control signal 190 in response to a fuel signal 184, torque signals 186 and 187, and a spark signal 188. For example, the fuel signal 184 can be a fuel signal 115, 156, or the like described above. The torque signals 186 and 187 can be the instantaneous torque and longer-term torque described above. From these signals, a spark control signal 190 can be generated.

Although a spark signal 188 has been described as an input, some engines may not use a spark input. For example, a CI engine may not have a spark input, let alone an optimal spark. Accordingly, such inputs can be ignored, may not be present, or the like when the control system is configured for a CI engine.

Figure 7:
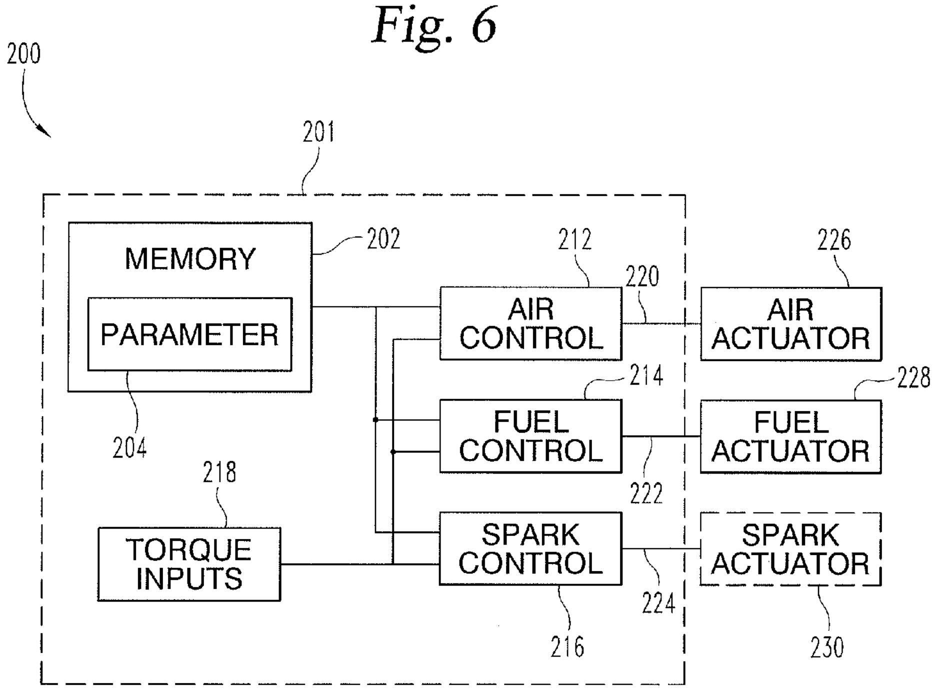
FIG. 7 is a block diagram of a torque based engine control system according to an embodiment.

FIG. 7 is a block diagram of a torque based engine control system according to an embodiment. In this embodiment, the engine control system 200 can include a controller 201 similar to controller 11 described above. That is, the controller 201 can include torque inputs 218, an air control 212, a fuel control 214, a spark control 216, and be configured to generate the associated control signals 220, 222, and 224 for actuators 226, 228, and 230.

However, the controller 201 can include a memory 202 configured to store a parameter 204. Although illustrated as part of the controller 201, the memory 202 can be separate from the controller 201, distributed between the controller 201 and external systems or the like. Furthermore, the memory 202 can be configured to store other code and/or data associated with the controller 201 or other control systems.

The controller 201 can be configured to control air and fuel delivered to an engine in response to the parameter 204. In particular, the engine can be controlled in a stoichiometric mode when the parameter has a first value and a lean mode when the parameter has a second value.

In particular, the parameter 204 can represent various aspects of the control system that can differ between CI and SI engines. As described above, CI engines and SI engines can have different AFR limits. The AFR limits are examples of the parameter. That is, if upper and lower AFR limits are substantially equal, the engine can be controlled in a stoichiometric mode and if the upper and lower AFR limits are unequal, the engine can be controlled in a lean mode.

Other parameters of the control system that can be the parameter 204 can include torque models used for the various torque to air or fuel converters and spark controls described above. That is, particular torque models can be used for an SI engine while different torque models can be used for a CI engine. A given torque model can be loaded into the memory 204 and cause the controller 201 to operate in a stoichiometric mode, a lean mode, or the like.

Although various types of parameters have been used as examples of the parameter 204, the parameter can be an abstract parameter. For example, the parameter 204 can be a flag, bit, register, or the like that can be set to indicate an operational mode. That is, once the parameter 204 is set, appropriate AFR limits, torque models, or the like can be selected and used during operation of the engine. As a result, common software, firmware, or the like can be used among multiple engine types by changing configurable parameters stored in the memory 202. Thus, multiple versions need not be maintained for multiple engine types.

Figure 8:
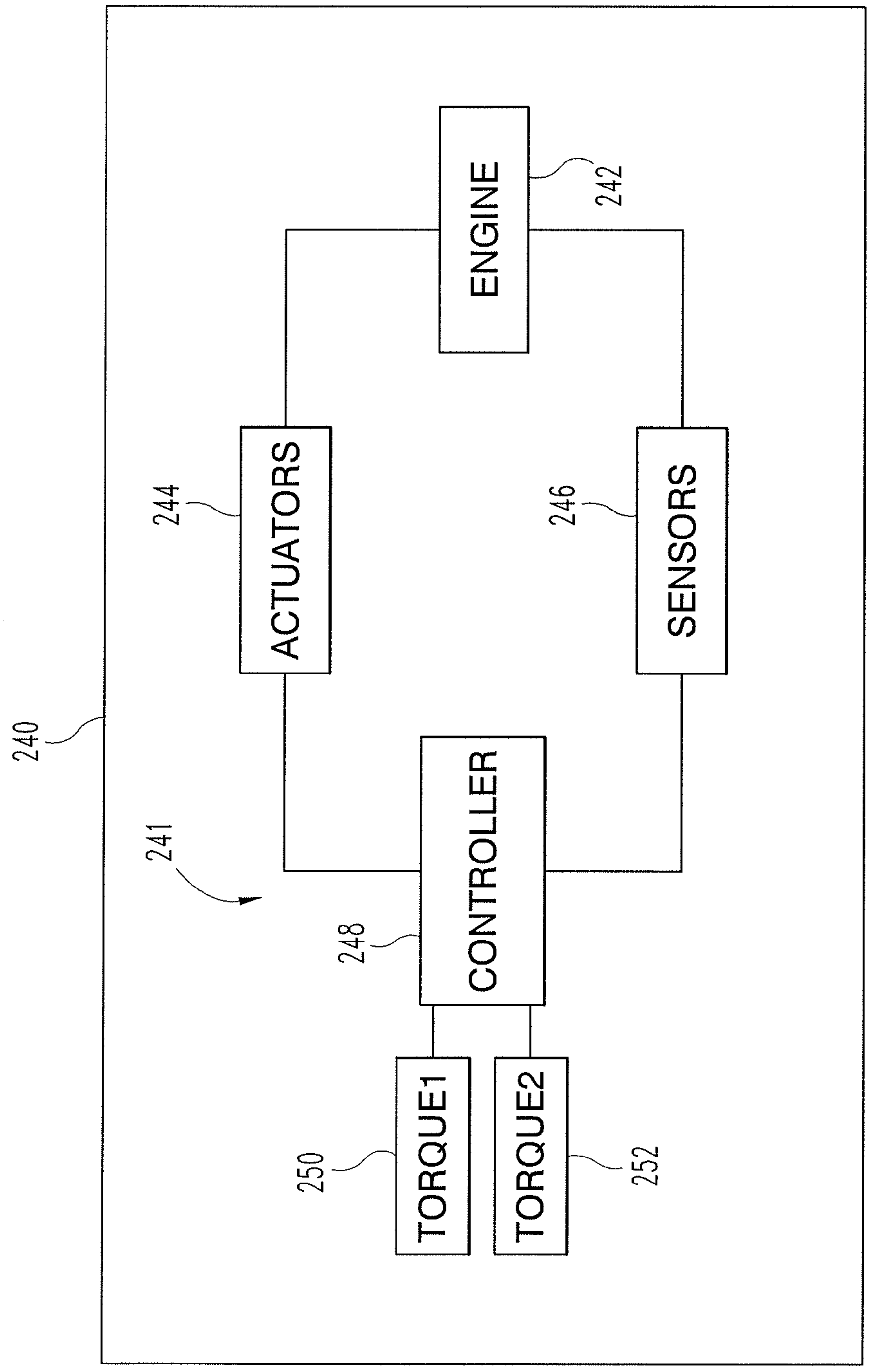
FIG. 8 is a block diagram of a vehicle with an engine system according to an embodiment.

FIG. 8 is a block diagram of a vehicle with an engine system according to an embodiment. In this embodiment, the vehicle 240 includes an engine system 241 configured to provide power for the vehicle 240. The engine system 241 includes a controller 248 coupled to actuators 244 and sensors 246 coupled to an engine 242. The controller 248 can be configured to implement the various air, fuel, and spark controls described above in response to torque inputs 250 and 252 from various other sources.

Furthermore, in an embodiment, the engine system 241 can, but need not directly provide locomotive power for the vehicle 240. For example, the engine system 241 can be configurable to drive an electric motor and/or generator.

Although a controller 248 has been described as performing the air, fuel, and spark control for an engine 242, the controller 248 can, but need not be dedicated for such function. That is, the controller 248 can be part of a larger engine management system, emissions control system, or the like. Furthermore, the functionality of the controller 248 can be spread across multiple devices, processors, sub-systems, or the like.

The controller 248 can be implemented in a variety of ways. For example, the controller 248 can include a general purpose processor, a microcontroller, an application specific integrated circuit, a programmable logic device, a combination of such devices, or the like.

An embodiment includes a computer-readable medium storing computer-readable code that when executed on a computer, causes the computer to perform the various techniques described above. The computer-readable medium can also be configured to store various parameters described above. Thus, in an embodiment, the code can remain common across engine types, yet the parameters can be separately configurable and stored to create an engine-specific distribution.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:

an air actuator configured to control air delivered to an engine;

a fuel actuator configured to control fuel delivered to an engine; and a controller configured to:

actuate the air actuator in response to a first torque signal; and actuate the fuel actuator in response to a second torque signal.

2. The system of claim 1, wherein the controller is further configured to:

generate a first fuel signal in response to the first torque signal; and generate a second fuel signal in response to the second torque signal.

3. The system of claim 2, wherein the controller is further configured to generate an air signal in response to the first fuel signal.

4. The system of claim 3, wherein the controller is further configured to limit the air signal in response to at least one air-to-fuel ratio limit.

5. The system of claim 2, wherein the controller is further configured to limit the second fuel signal in response to at least one air-to-fuel ratio limit.

6. The system of claim 5, wherein the controller is further configured to adjust the limited second fuel signal in response an oxygen sensor.

7. The system of claim 1, further comprising:

a spark actuator;

wherein the controller is further configured to actuate the spark actuator in response to at least one of the first torque signal and second torque signal.

8. The system of claim 1, wherein the controller is further configured to:

generate a first air signal in response to the first torque signal; and generate a second air signal in response to the second torque signal.

9. The system of claim 8, wherein the controller is further configured to actuate the air actuator in response to a maximum of the first air signal and the second air signal.

10. The system of claim 8, wherein the controller is further configured to generate a fuel signal in response to a maximum of the first air signal and the second air signal.

11. A method comprising:

actuating an air actuator in response to a first torque control signal;

actuating a fuel actuator in response to a second torque control signal; and operating an engine in response to the air actuator and the fuel actuator.

12. The method of claim 11, further comprising:

generating a first fuel signal in response to the first torque signal; and generating a second fuel signal in response to the second torque signal.

13. The method of claim 12, further comprising generating an air signal in response to the first fuel signal.

14. The method of claim 13, further comprising limiting the air signal in response to at least one air-to-fuel ratio limit.

15. The method of claim 12, further comprising limiting the second fuel signal in response to at least one air-to-fuel ratio limit.

16. The method of claim 15, further comprising adjusting the limited second fuel signal in response an oxygen sensor.

17. The method of claim 11, further comprising actuating a spark actuator in response to at least one of the first torque signal and second torque signal.

18. The method of claim 11, further comprising:

generating a first air signal in response to the first torque signal; and generating a second air signal in response to the second torque signal.

19. The method of claim 18, further comprising actuating the air actuator in response to a maximum of the first air signal and the second air signal.

20. The method of claim 18, further comprising generating a fuel signal in response to a maximum of the first air signal and the second air signal.

21. A computer-readable medium storing computer-readable code that when executed on a computer, causes the computer to:

actuate an air actuator in response to a first torque control signal;

actuate a fuel actuator in response to a second torque control signal; and operate an engine in response to the air actuator and the fuel actuator.

22. The computer-readable medium of claim 21, further storing computer-readable code that when executed on the computer, causes the computer to:

generate a first fuel signal in response to the first torque signal; and generate a second fuel signal in response to the second torque signal.

23. The computer-readable medium of claim 22, further storing computer-readable code that when executed on the computer, causes the computer to generating an air signal in response to the first fuel signal.

24. The computer-readable medium of claim 23, further storing computer-readable code that when executed on the computer, causes the computer to limit the air signal in response to at least one air-to-fuel ratio limit.

25. The computer-readable medium of claim 22, further storing computer-readable code that when executed on the computer, causes the computer to limit the second fuel signal in response to at least one air-to-fuel ratio limit.

26. The computer-readable medium of claim 21, further storing computer-readable code that when executed on the computer, causes the computer to actuate a spark actuator in response to at least one of the first torque signal and second torque signal.

27. The computer-readable medium of claim 21, further storing computer-readable code that when executed on the computer, causes the computer to:

generate a first air signal in response to the first torque signal; and generate a second air signal in response to the second torque signal.

28. The computer-readable medium of claim 27, further storing computer-readable code that when executed on the computer, causes the computer to actuating the air actuator in response to a maximum of the first air signal and the second air signal.

29. The computer-readable medium of claim 27, further storing computer-readable code that when executed on the computer, causes the computer to generate a fuel signal in response to a maximum of the first air signal and the second air signal.

* * * * *